J. W. MARKS.
MEAT TONGUE.
APPLICATION FILED SEPT. 12, 1914.
1,116,601.
Patented Nov. 10, 1914.
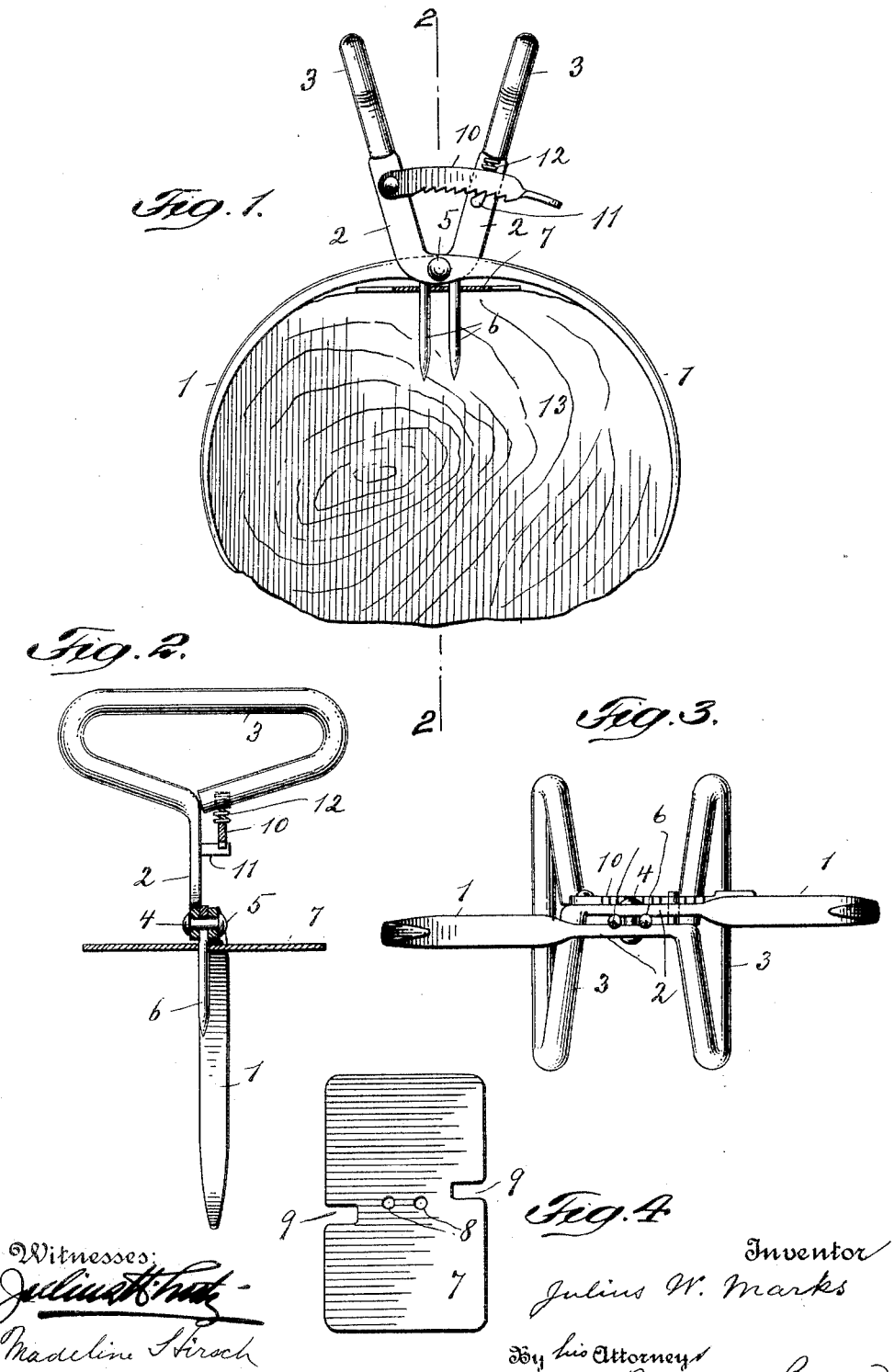

UNITED STATES PATENT OFFICE.

JULIUS W. MARKS, OF NEW YORK, N. Y.

MEAT-TONGUE.

1,116,601.  Specification of Letters Patent.  Patented Nov. 10, 1914.

Application filed September 12, 1914. Serial No. 861,334.

*To all whom it may concern:*

Be it known that I, JULIUS W. MARKS, a citizen of the German Empire, and residing in the city of New York, in the county and State of New York, have invented certain new and useful Improvements in Meat-Tongues, of which the following is a specification.

This invention relates to tongues of novel construction more particularly adapted for feeding hams and other meat products against the cutter of a slicing machine. By my invention the hams are tightly grasped and may be presented to the cutter without any physical contact with the hand of the operator, so that modern sanitary conditions are complied with.

In the accompanying drawing: Figure 1 is a side view partly in section of meat tongues embodying my invention; Fig. 2 a section on line 2—2, Fig. 1; Fig. 3 a bottom view with the presser plate omitted, and Fig. 4 an enlarged plan of the presser plate.

The tongues comprise essentially a pair of pivotally connected members, which are alike in all essential respects. Each member is made of a single piece of material, being composed of a curved jaw 1, from the upper end of which there extends an arm 2, terminating in a looped grip or handle 3. The jaws 1, of the two members are opposed to each other, and are furnished with wide inner gripping faces, so as to firmly grasp the body of the meat without unduly indenting the same. The pivot 4 that connects the jaws, carries at one end, a nut 5 that permits the ready assemblage of the parts. The length of the pivot is such that the jaws are slightly spaced from each other at their fulcrum, so that in this way part of the pivot is bared between the jaws. This exposed part of the pivot is straddled by a U shaped member or fork 6, which extends with its two pointed prongs, a substantial distance inwardly from the jaws. Fork 6 is free to turn on pivot 4 and is entirely independent of the jaws so that it will not participate in the opening or closing movement thereof. Upon fork 6 there is fixedly mounted, a presser plate 7, which is perforated as at 8, for the accommodation of the fork-prongs, and is notched as at 9, for permitting an unobstructed sweep of the jaws. Plate 7, is located directly beneath the upper portions of the jaws, and extends a distance sidewise thereof, so as to furnish a bearing surface of considerable size for the meat, while also serving to prevent an unseating of the fork from the pivot. Means are provided for sustaining the tongue in its contracted position after it has been closed upon the meat. These means consist of a curved rack 10 having beveled teeth and pivoted to one of the arms 2. The rack is adapted to engage a knife edge lug 11, formed on the second arm. A coiled spring 12 interposed between the rack and the handle 3, of this second arm, tends to hold the rack in engagement with the lug. In use the jaws are opened, fork 6 is stuck into the meat 13, so that presser plate 7, is forced firmly down upon the same, and then the jaws, are closed to firmly grasp the meat. During this last named operation rack 10 will glide freely over lug 11, and will securely lock the jaws in their contracted position, so that the meat will be firmly held without requiring manual exertion. After the slicing operation has been finished, the rack is lifted, against action of spring 12, the jaws are opened and the fork is pulled out of the meat.

I claim:

1. Meat tongues comprising a pair of jaws, handles carried thereby, a pivot connecting the jaws, and a fork straddling the pivot and extending inwardly from the jaws.

2. Meat tongues comprising a pair of jaws, handles carried thereby, a pivot connecting the jaws, a fork straddling the pivot and extending inwardly from the jaws, and a presser plate mounted on the fork and extending below the pivoted portions of the jaws.

JULIUS W. MARKS.

Witnesses:
 FRANK V. BRIESEN,
 MADELINE HIRSCH.

Copies of this patent may be obtained for five cents each, by addressing the "Commissioner of Patents, Washington, D. C."